United States Patent
Badaroux

(10) Patent No.: US 10,864,693 B2
(45) Date of Patent: Dec. 15, 2020

(54) METHOD AND DEVICE FOR PLACING AND ATTACHING A STRIP INSIDE A TIRE

(71) Applicant: SEEB AUTOMATION, Saint Priest en Jarez (FR)

(72) Inventor: Paul Badaroux, Saint Priest en Jarez (FR)

(73) Assignee: SEEB AUTOMATION

( * ) Notice: Subject to any disclaimer, the term of this patent is extended or adjusted under 35 U.S.C. 154(b) by 316 days.

(21) Appl. No.: 15/532,533

(22) PCT Filed: Dec. 3, 2015

(86) PCT No.: PCT/FR2015/053307
§ 371 (c)(1),
(2) Date: Jun. 2, 2017

(87) PCT Pub. No.: WO2016/087786
PCT Pub. Date: Jun. 9, 2016

(65) Prior Publication Data
US 2017/0348929 A1    Dec. 7, 2017

(30) Foreign Application Priority Data

Dec. 4, 2014  (FR) .................................. 14 61894
Jun. 3, 2015  (FR) .................................. 15 55024

(51) Int. Cl.
*B29D 30/06*     (2006.01)
*B60C 19/00*     (2006.01)
(Continued)

(52) U.S. Cl.
CPC ..... *B29D 30/0685* (2013.01); *B29D 30/0061* (2013.01); *B29D 30/0681* (2013.01);
(Continued)

(58) Field of Classification Search
CPC ............... B29D 30/0061; B29D 30/06; B29D 2030/0072; B29D 2030/0077;
(Continued)

(56) References Cited

U.S. PATENT DOCUMENTS 4,400,230 A * 8/1983 Wyslotsky .......... B32B 38/1833
156/324
4,474,338 A * 10/1984 Hirano ............... B29D 30/3007
156/123
(Continued)

FOREIGN PATENT DOCUMENTS

EP   1559590 A2   8/2005
EP   2239152 A1   10/2010
(Continued)

OTHER PUBLICATIONS

PCT International Search Report dated Mar. 2, 2016 from corresponding Application No. PCT/FR2015/053307.

*Primary Examiner* — Robert C Dye
*Assistant Examiner* — Sedef E Paquette
(74) *Attorney, Agent, or Firm* — Dilworth IP, LLC

(57) ABSTRACT

The invention presents a device and a method for placing and attaching a strip inside a tire. Specifically, the tire is positioned flat on a mounting between self-centering arms, and an adhesive device is placed inside the tire. While the tire is rotated, the strip is moved inside the tire, wherein a pressure force is applied to said strip. The strip is driven at a linear speed greater than the rotation speed of the tire, thus producing an effect of compressing said strip, the length of which becomes less than the nominal length thereof, thus creating a space between both ends of the strip such that, after release, the strip scrapes the adhesive device, which is repositioned on said ends, thus simultaneously causing said ends to be attached end to end.

2 Claims, 5 Drawing Sheets

(51) Int. Cl.
*B29D 30/00* (2006.01)
*B60C 5/00* (2006.01)
*B60C 17/04* (2006.01)

(52) U.S. Cl.
CPC .............. *B60C 5/007* (2013.01); *B60C 17/04* (2013.01); *B60C 19/002* (2013.01); *B29D 2030/0072* (2013.01); *B29D 2030/0077* (2013.01); *B29D 2030/0686* (2013.01); *B29D 2030/0694* (2013.01)

(58) Field of Classification Search
CPC .... B29D 2030/0683; B29D 2030/0685; B29D 2030/0686; B29D 30/44; B29D 2030/0694; B29D 2030/2671; B29D 2030/2685; B29D 2030/2692; B29D 2030/4437; B29D 2030/445; B29D 2030/4456; B29D 30/0681; B29D 30/0685; B60C 5/007; B60C 5/14; B60C 5/142; B60C 17/04; B60C 19/002; B60C 19/003; B60C 19/12; B60C 19/122; B60C 19/125; B60C 19/127; B60C 11/24; B60C 11/243; B60C 2019/004; B60C 2019/006; B29C 73/166

USPC ....................... 156/110.1; 152/155
See application file for complete search history.

(56) References Cited

U.S. PATENT DOCUMENTS

| | | | |
|---|---|---|---|
| 2006/0032564 A1* | 2/2006 | Weaver | B60C 23/0408 |
| | | | 152/152.1 |
| 2010/0276049 A1* | 11/2010 | Yukawa | B60C 19/002 |
| | | | 152/450 |
| 2011/0308677 A1 | 12/2011 | Kamprath et al. | |
| 2013/0243987 A1* | 9/2013 | Fougeras | B29D 30/3028 |
| | | | 428/36.8 |
| 2014/0283740 A1* | 9/2014 | Son | B29D 30/0685 |
| | | | 118/318 |

FOREIGN PATENT DOCUMENTS

| | | |
|---|---|---|
| JP | 2007168243 A | 7/2007 |
| JP | 2009160762 A | 7/2009 |
| KR | 20100043653 A | 4/2010 |

\* cited by examiner

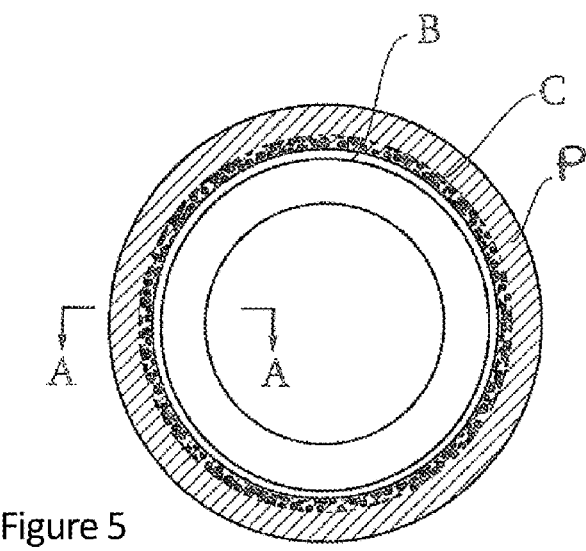
Figure 5
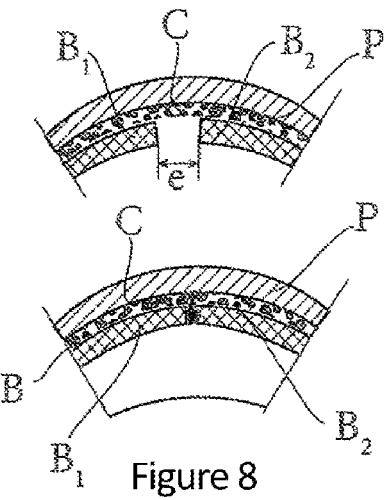
Figure 7
Figure 8
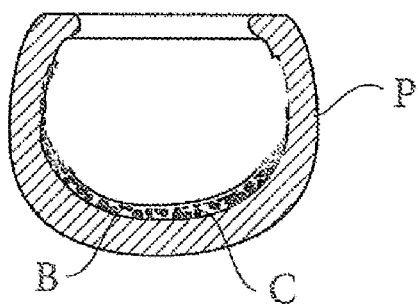
Figure 6

METHOD AND DEVICE FOR PLACING AND ATTACHING A STRIP INSIDE A TIRE

The invention finds advantageous application in the placement of a strip intended to dampen the rolling noise of a tire, in particular for motor vehicles.

In the automotive field, with the aim of reducing noise pollution, the importance of reducing unwanted noise has become evident. Thus, the suggestion was made for strips of a specific design intended to be inserted inside a tire in order to reduce, significantly, the noise resulting from said tire rolling on the pavement, and this, regardless of the type of road covering. One type of anti-noise strip can be seen, for example, from the teachings of the document U.S. 2011/0308677. Consequently, one problem pertaining to the placement of these strips inside a tire is that such placement cannot conceivably be carried out manually.

Considering the relatively recent development of such anti-noise strips, the few technical solutions proposed to date for automatically placing a strip inside a tire are not entirely satisfactory. For example, according to the teaching of the document JP 2007168243, the strip is produced as a reel and is pre-subjected on one of the faces thereof to the application of an adhesive that is coated with a protective film which is then removed as the strip is placed in position.

The problem that the invention proposes to solve is to make it possible to place and attach, automatically, within a tire, a strip, whose length is roughly equal to the internal circumference of said tire.

In order to solve such a problem, a method has been devised and developed wherein:
the tire is positioned on a support in relation to centering means,
an adhesive device is placed inside the tire,
the tire is rotated,
the strip, to which a pressure force is applied while it is being moved inside the tire, is moved inside the tire,
said strip is driven at a linear speed greater than the rotation speed of the tire, thus producing an effect of compressing said strip, the length of which becomes less than the nominal length thereof, thus creating a space between both ends of the strip such that, after the release thereof, the strip scrapes the adhesive device, which is repositioned on said ends, thus simultaneously causing said ends to be attached end to end.

The result of these characteristics is that the difference in speed between the rotation of the tire and the linear drive speed of the strip allows for perfect positioning of the strip inside the tire thus avoiding all sliding phenomena and the formation of any folds or other defects, while still allowing, in a simultaneous manner, for the attachment of the strip, including in an end-to-end manner at its ends.

The invention also concerns a device for placing and attaching the strip inside the tire. According to the invention, the device comprises:
means for positioning and centering the tire on a support,
means for rotating a tire,
means for guiding the strip in the direction of the inside of the tire,
means for linearly driving the strip, and for applying pressure to the strip inside the tire at a speed greater than the rotation speed of the tire.

In order to solve the problem posed in ensuring the positioning and the centering of the tire, the device uses means comprising self-centering arms, wherein the free or motorized ends thereof are intended to bear against the tread of the tire.

Advantageously, the rotation of the tire is performed by motorized rollers that are controlled with respect to the position thereof by encoders in order to avoid any risk of the tire slipping with respect to the drive rollers.

According to a further characteristic, the self-centering arms are mounted in relation to the support that receives the tire, which support is mounted with the ability to move in order to be positioned in line with the means for guiding the strip. The tire is positioned flat on the support between the self-centering arms, said support being secured to an actuator member in order to be moved vertically in height.

In order to solve the problem of moving the strip inside the tire, the means for guiding the strip comprise an inclined chute having internal arrangements for holding the strip in the final position thereof for the purpose of gripping it by linear drive means, In one embodiment, the linear drive means of the strip are arranged at the end of the conveying and guiding chute.

BRIEF DESCRIPTION OF THE DRAWINGS

The invention is described below in more detail using the figures of the drawings attached, wherein:
FIG. 5 is a schematic, longitudinal section, plan view of a tire fitted internally with an anti-noise strip placed and attached according to the characteristics of the invention,
FIG. 6 is, on a larger scale, a cross-sectional view, viewed along the line AA of FIG. 5.
FIG. 7 is a partial view, on a larger scale, of FIG. 5, before the strip is released,
FIG. 8 is a similar view of FIG. 7, before the strip is released, As indicated, the invention is applicable to all types of tires, regardless of the dimensions thereof, for all types of motor vehicles, with a view to the continuous automatic placing of a strip inside a tire, with the aim of significantly reducing noise from rolling and other sources.

Figure 1:
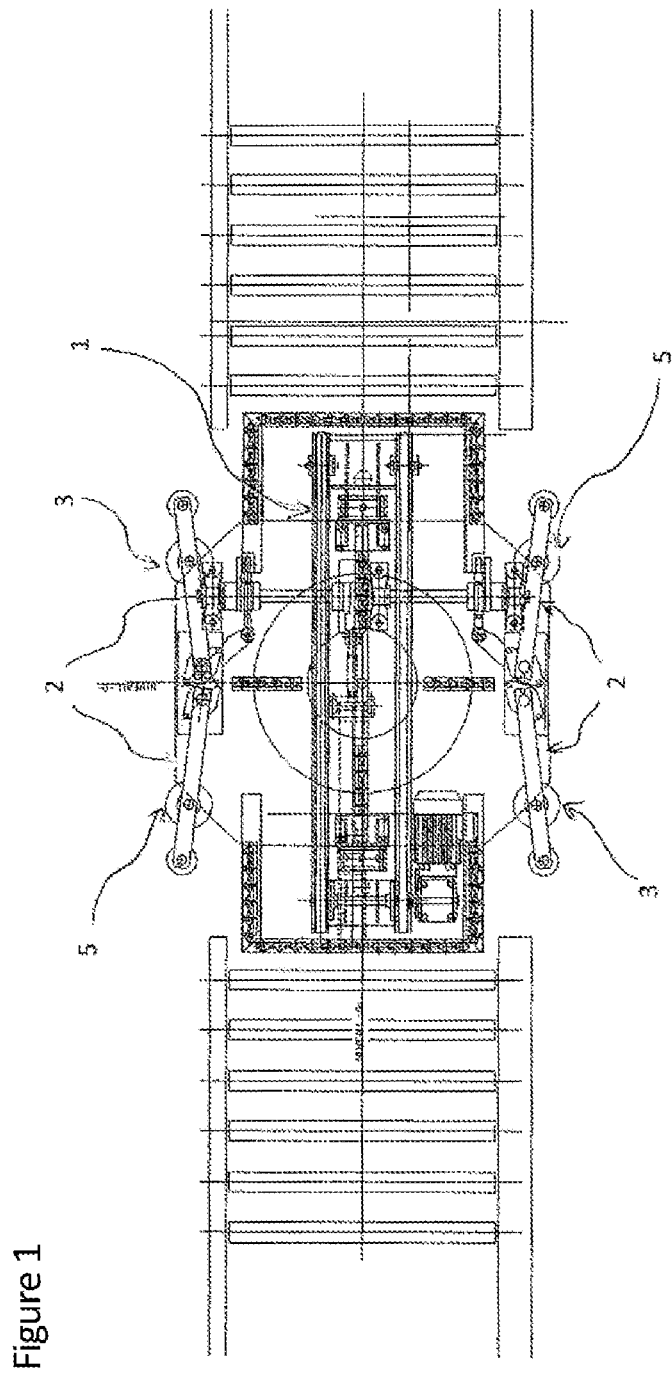
FIG. 1 is a plan view of the tire positioning and centering station.
Figure 2:
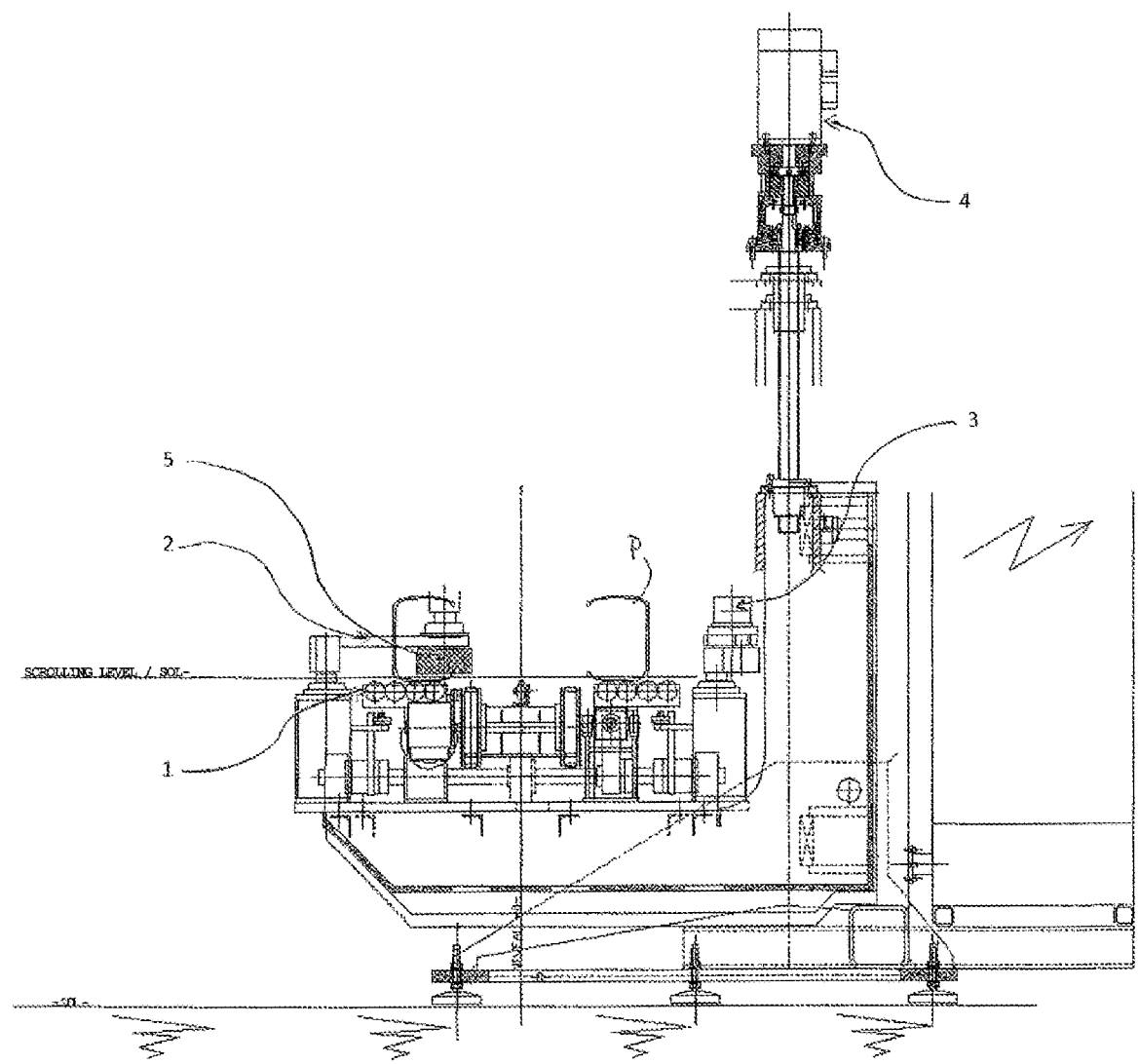
FIG. 2 is a side view corresponding to FIG. 1.
Figure 3:
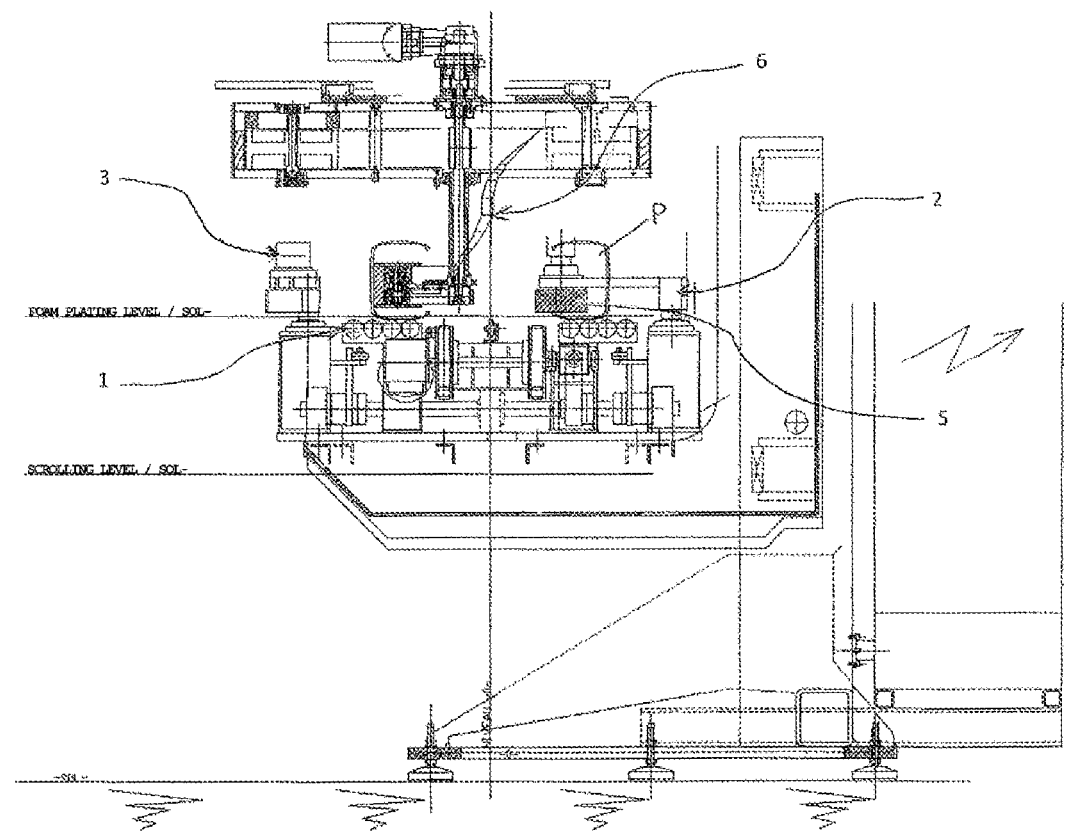
FIG. 3 illustrates, in elevation, the tire support for the positioning of the strip.
Figure 4:
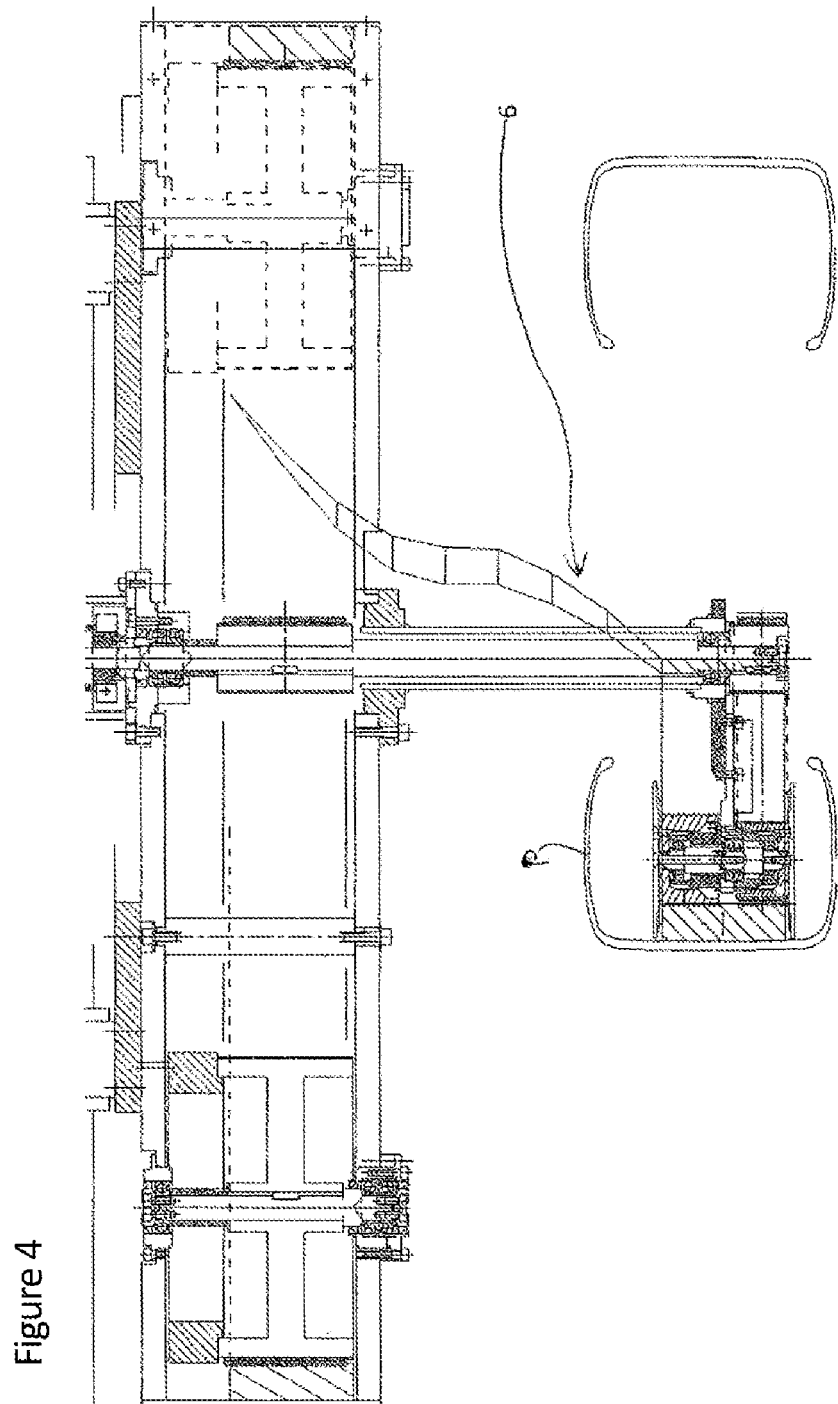
FIG. 4 illustrates the positioning of the strip inside the tire.

The invention can be applied to the installation of strips of the type defined in the document U.S. 2011/0308677, without thereby excluding other types of strips of characteristics determined by and adapted to the dimensions of the tire which can be manufactured from different materials.

In the remainder of the description, the tire is designated by (P) and the strip, whatever the type, by (B).

As illustrated in the figures of the drawings, the device comprises positioning means for the centering of the tire (P) on a support (1). These means constitute self-centering arms (2), wherein the free or motorized ends thereof are intended to bear against the tread of the tire (P). Advantageously, the self-centering arms (2) are offset at an angle. These arms are mounted on a fixed part of a frame, for example, by being secured to a control cylinder (4) for the angular displacements thereof in the direction of the tread of the tire.

Advantageously, the tire (P) is positioned flat on the support (1) between the self-centering arms (2). The support (1) is secured to an actuator member (4), such as a cylinder, for the vertical movement in height thereof, in order to be positioned in relation to the means for guiding and driving the strip (B) in the direction of the inside of the tire, as shall be indicated in the remainder of the description.

The rotation of the tire (P) is performed by motorized rollers (5), that are controlled with respect to the position thereof by encoders (3) in order to avoid any risk of the tire slipping with respect to said rollers.

The strips (B) are transferred from a storage location by any known and appropriate means to an inclined guide chute (6) in order to be directed towards the inside of the tire. For example, the chute (6) has internal arrangements for holding the strip in the final position thereof in order thereby to be gripped by linear drive means. For example, these linear drive means are arranged at the end of the conveying and guiding chute (6), and may comprise motorized rollers.

Prior to placing this strip inside the tire, an adhesive product of all known and appropriate types is deposited and a pressure force is applied to the strip as it is linearly driven, inside the tire, which is itself driven in rotation. The pressure of the strip inside the tire depends upon the constituent material of the strip and the adhesive product. The pressure applied is adjustable as a function of the characteristics thereof according to greater or lesser forces.

The placing and attaching of the strip (B) inside the tire (P) is performed as follows:
- a tire is positioned on a support (1), in relation to the centering means (2)
- the tire (P) is rotated,
- the adhesive device (C) is arranged within the tire,
- the strip (B) is brought inside the tire (P), driving said strip (B) at a linear speed that is higher than the rotation speed of the tire (P).

According to the invention, this difference in speed between the rotation of the tire (P) and the linear drive of the strip (B) is important in order to allow, in a surprising and unexpected manner, for the end-to-end attachment of the ends (B1) and (B2) of the strip (B), after being placed inside the tire. This difference in speed subjects the strip to a compression effect such that the length of said strip becomes less than the nominal length thereof, which nominal length is greater than or equal to the internal perimeter of the tire.

For example, for a tire whose internal perimeter length is X centimeters, the length of the strip is between X and X+2 centimeters. When positioned inside the tire the two ends (B1) and (B2) of the strip (B) are separated by a gap (e). As a result, upon termination of the compression phenomenon, the strip (B) releases and scrapes the adhesive device (C), which tends naturally to reposition itself on the ends of the strip, thus simultaneously enabling said ends to be attached end to end.

Reference is made to FIGS. 7 and 8, which respectively illustrate the compression of the strip (FIG. 7) and subsequently the release thereof, which is inherent to the end-to-end attachment of the ends of the strip (FIG. 8).

As indicated, for perfect positioning of the strip inside the tire, the rotation speed of the tire (P) is less than the linear drive speed of the strip (B), thus avoiding all slipping phenomena with the aim of ensuring that the strip is perfectly flat on the inside of the tire without any folds or defects and that it is perfectly attached, including in an end-to-end manner at its ends. Data pertaining to different characteristics of the tire and of the strip are entered into a specific program in order to ensure this perfect synchronization between the speed of rotation of the tire and the linear drive speed of the strip.

Obviously, the device can be integrated into an automated assembly line, integrating several stations, namely a tire supply station, a cleaning station for the inside of the tire, a pre-gluing station for the inside of the tire, a centering station for the tire, a system for cutting the strip into a roll, a station for placing the strip inside the tire and means for removing the tire thus fitted with the strip.

The advantages are apparent from the description.

The invention claimed is:

1. A method for placing and attaching a strip inside a tire, the strip having a nominal length greater than or equal to an inner circumference of the tire, according to which method:
   - the tire is positioned flat on a support between self-centering arms having free or motorized ends bearing against a tread of the tire,
   - an adhesive product is arranged within the tire,
   - the tire is rotated,
   - the strip, to which a pressure force is applied, is moved inside the tire,
   - wherein said strip is driven at a linear speed greater than a rotation speed of the tire, thus producing an effect of compressing said strip, causing the strip, during said process of moving inside the tire, to have a length that becomes less than the nominal length thereof, thus creating a space between both ends of the strip such that, after release, the strip scrapes the adhesive product, which adhesive product is repositioned on said ends, thus simultaneously causing said ends to be attached end to end.

2. The method according to claim 1, wherein the pressure force is applied to the strip as it is moved inside the tire.

* * * * *